United States Patent [19]

Watson

[11] Patent Number: 4,884,432

[45] Date of Patent: Dec. 5, 1989

[54] BACKUP FOR A CLAMP CRIMPER

[75] Inventor: Arthur I. Watson, Bartlesville, Okla.

[73] Assignee: Camco, Incorporated, Houston, Tex.

[21] Appl. No.: 313,110

[22] Filed: Feb. 21, 1989

[51] Int. Cl.[4] .......................... B21D 7/06; B23P 11/00

[52] U.S. Cl. .......................................... 72/410; 81/9.3; 29/243.5

[58] Field of Search .................. 72/410; 81/9.3, 426.5, 81/424.5, 418; 29/243.5, 268, 283.5, 283

[56] References Cited

U.S. PATENT DOCUMENTS

| | | | |
|---|---|---|---|
| 838,008 | 12/1906 | Chandler et al. . | |
| 1,038,109 | 9/1912 | Flora . | |
| 1,084,935 | 1/1914 | Flora et al. . | |
| 1,691,353 | 11/1928 | Jones | 29/243.56 |
| 1,693,755 | 12/1928 | Hotz . | |
| 3,257,874 | 6/1966 | Madeira | 81/9.3 |
| 3,475,793 | 11/1969 | Oetiker | 81/9.3 |
| 4,003,238 | 1/1977 | Oetiker . | |
| 4,111,022 | 9/1978 | Kruschel | 72/410 |
| 4,724,729 | 2/1988 | Oetiker | 72/410 |

FOREIGN PATENT DOCUMENTS

| | | | |
|---|---|---|---|
| 201689 | 1/1959 | Austria | 72/410 |
| 681752 | 10/1952 | United Kingdom | 72/410 |

*Primary Examiner*—Daniel C. Crane

*Attorney, Agent, or Firm*—Fulbright & Jaworski

[57] ABSTRACT

In combination with a manually operated crimper for tightening ear clamps in which the tool has two complementary lever arms with handles at one end and jaw portions at the other end of a backup disk. A disk is positioned in a slot in the arms of the tool and encircles and rotates around the tool pivot pin. An arcuate anvil is positioned at the outer periphery of the disk and forms an outer backup surface. Anvil shoulders at each end of the anvil coact with shoulders on the arms. The disk is rotated and held adjacent the jaw portions as the jaws close for engaging the clamp ear.

6 Claims, 3 Drawing Sheets

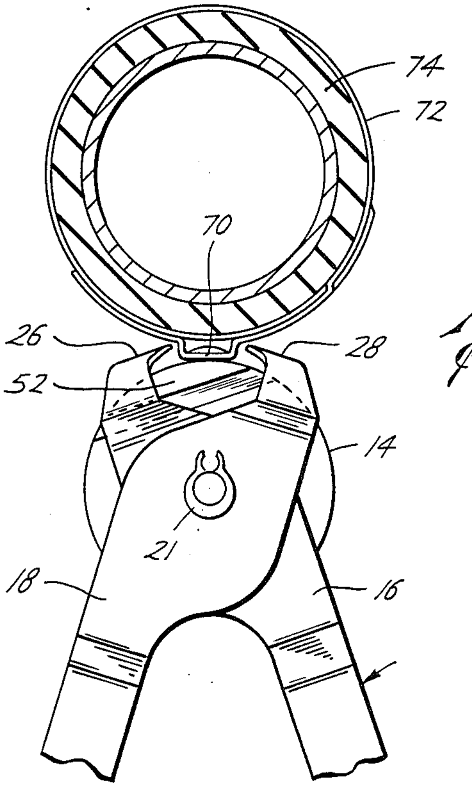
Fig. 4
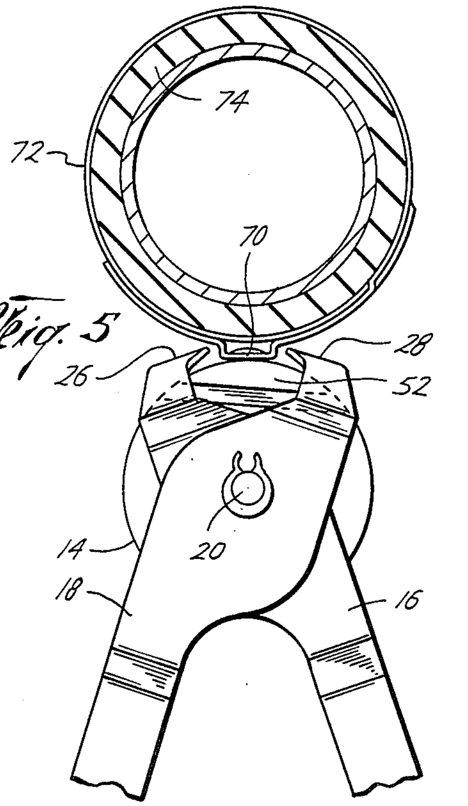
Fig. 5
Fig. 7
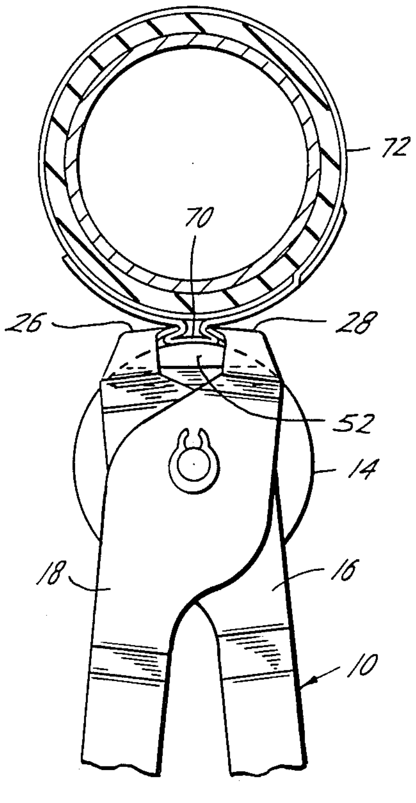
Fig. 6
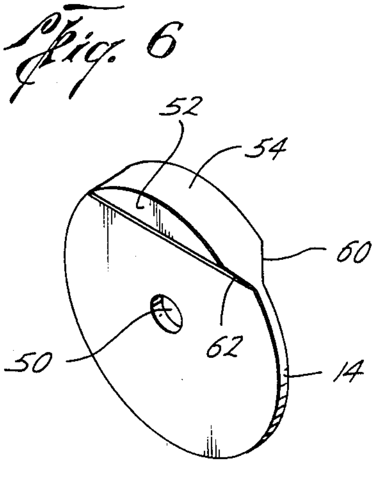

BACKUP FOR A CLAMP CRIMPER

BACKGROUND OF THE INVENTION

It is conventional to use an Oetiker Model 1097 I Economy Pincer to crimp an ear of a band clamp for clamping one member against another member. However, when crimping an ear with this crimper the ear of the clamp often bulges outwardly, interfering with a housing which is to go over the clamped members, and also results in a less predictable clamp tension.

The present invention is directed to a crimper that includes a backup disk having an anvil which prevents excessive outward bulging of the ear of a band-type clamp when the tool is used to crimp the ear. The present backup disk is particularly useful in combination with the above-described crimper and its relationship with the jaws of the Oetiker tool. Because of the configuration of the disk relative to the configuration of the jaws, the backup disk is rotated and maintained in proper backup position as the jaws close. The present disk is simple and yet effective, is prevented from rotating away from the crimped ear, and is always at a constant distance from the biting surfaces of the jaws. While there are other types of backups on other types of crimpers, they do not provide the same structure, operation or result as the present invention.

SUMMARY

The present invention is directed to a backup disk in combination with a manually operated tool for tightening ear clamps. The tool includes two complementary lever arms pivotally connected at an intermediate point by a pivot pin. The arms have handle portions at one end and have complementary jaw portions at the other ends. The other ends each include first and second sides separated by a slot and each of the first and second sides includes an outwardly directed shoulder adjacent said slot and said shoulders are positioned adjacent to but spaced from the jaw portions. The crimping tool includes a disk including a hole and the disk is rotatably positioned in the slot between the first and second sides of each of the other ends of the arms with the disk hole encircling the pivot pin. An arcuate anvil is positioned at the outer periphery of one section of the disk and the anvil forms an outer backup surface for engaging a clamp. Shoulders are provided at each end of the anvil and the shoulders are engagable by the arms for rotating and holding said anvil adjacent the jaw portions as the jaws close.

Still a further object of the present invention is wherein the anvil is thicker than the disk.

Yet a still further object is wherein the anvil shoulders are formed by a cord and said anvil shoulders are shaped to be complementary with the outwardly directed shoulders.

A further object is wherein various shoulder means may be provided between the disk and the arms for limiting rotation of the disk for maintaining the anvil in position to engage the clamp ear.

Other objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 4 is a fragmentary view of the present invention in position for crimping a clamp in which the disk is in one position relative to the crimper arms, FIG. 5 is a view similar to FIG. 4 in which the disk is rotatably positioned in a different position from the crimper arms, FIG. 6 is a perspective view of one embodiment of the backup disk of the present invention, FIG. 7 is a view similar to FIGS. 4 and 5 in which the crimper is crimping the ear of a clamp and the backup disk engages the ear.

DESCRIPTION OF THE PREFERRED EMBODIMENT

Figure 1:
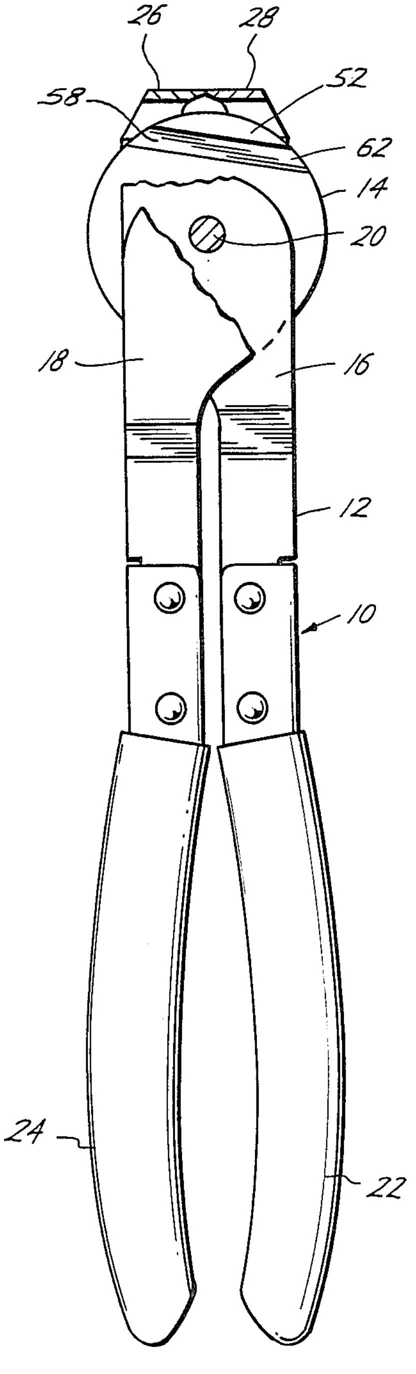
FIG. 1 is an elevational view, partly in section, of a present invention.
Figure 2:
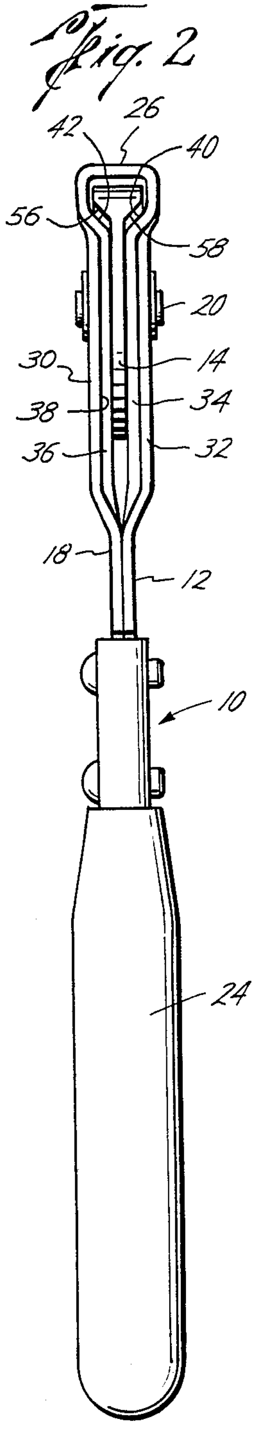
FIG. 2 is a first side elevational view of the apparatus of FIG. 1.
Figure 3:
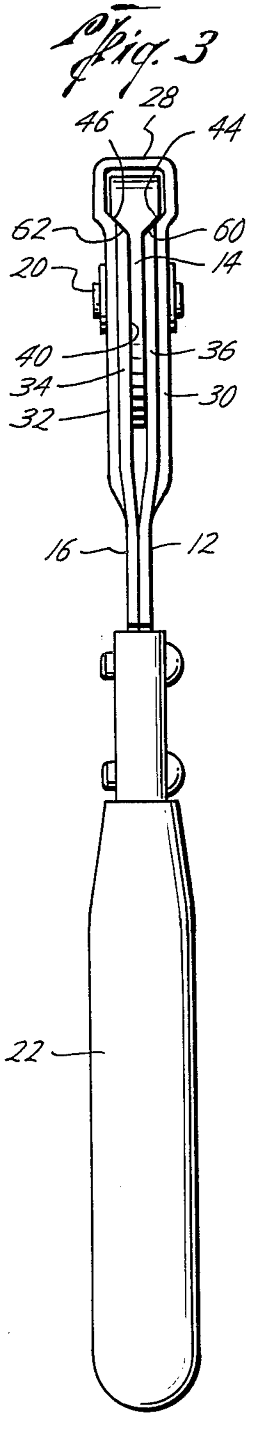
FIG. 3 is a second side elevational view of the apparatus of FIG. 1.

Referring now to the drawings, and particularly to FIGS. 1, 2 and 3, the reference numeral 10 generally indicates the present invention and generally includes the combination of a conventional Oteker Model 1097 I Economy Pincer generally indicated by the reference numeral 12 and a backup disk 14.

The crimper 12 includes first 16 and second 18 complmentary lever arms pivotally connected together at an intermediate point by a pivot pin 20. The arms 16 and 18 include handle portions 22 and 24, respectively, at one end. The arms 16 and 18, at the other ends, include complementary jaw portions 26 and 28, respectively.

The second or other ends of the arms 16 and 18 include first and second sides separated by a slot. That is, referring to FIG. 2, the second or other end of the arm 18 includes first and second sides 30 and 32. In referring to FIG. 3, the arm 16 has a second end having first and second sides 34 and 36. Thus, as best seen in FIG. 2, a slot 38 is provided between the first and second arms 30 and 32 of the arm 18 in which rotate the sides 34 and 36 of the arm 16 as well as the backup disk 14.

Referring to FIG. 3, a slot 40 is provided between the sides 34 and 36 of the arm 16 in which the rotatable disk 14 is positioned.

Each of the first and second sides of each of the arms 16 and 18 includes an outwardly directed shoulder adjacent their slots. Referring again to FIG. 2, the first and second sides 34 and 36 of the arm 16 include upwardly directed shoulders 41 and 42, respectively. And referring to FIG. 3, the first and second sides 30 and 32 of the arm 18 include shoulders 44 and 46, respectively.

The above description of the crimper 12, without the backup disk 14, is conventional. However, such a conventional crimper 12, when crimping an ear of a band clamp, often causes the ear to bulge outwardly and interfere with other equipment in some applications. When the ear bulges outward, it receives less severe crimping, resulting in a less predictable clamp tension. The combination of the disk backup 14 provides a backup surface which backs up the ear of a clamp and overcomes the problem in the use of the crimper 12 alone.

Referring now to FIGS. 1–3 and 6, the disk 14 is preferably a circular or arcuate disk including a hole 50. The disk 14 is rotatably positioned in the slot 40 between the sides 34 and 36 of the arm 16 and thus is also in the slot 38 of the arm 18. The hole 50 of the disk 14 encircles the pivot pin 20 and thus the disk 14 is rotatable around the pivot pin 20 and rotatable relative to the arms 16 and 18. The disk 14 includes an arcuate anvil 52 positioned at the outer periphery of one section of the disk 14. The anvil 52 forms an outer, preferably arcuate, backup surface 54 for engaging the ear of a clamp. Anvil shoulders are provided at each end of the anvil 52, preferably on an inner surface. That is, the anvil 52 includes shoulders 56 and 58, as best seen in FIG. 2 at one end of the anvil on its inner surface and includes shoulders 60 and 62, as best seen in FIG. 3 on its inner surface at its other end.

The anvil shoulders are engagable by the outwardly directed shoulders on the arms for rotating and holding the anvil 52 adjacent the jaw portions 26 and 28 as the jaws close. Referring to FIGS. 4 and 5, the tool 10 is shown in position for crimping an ear 70 on a conventional clamp 72 around a member 74. It is to be noted that while the anvil 52 is rotatable relative to the pivot pin 20 and the arms 16 and 18 the anvil 52 because of the coaction between the shoulders on the anvil and the shoulders on the arms 16 and 18 is rotated and maintained adjacent the ear 70 regardless of its initial rotational position. That is, coaction between the shoulders 41 and 42 on the arm 16 with the shoulders 58 and 56, respectively, on the anvil 52 limit rotation of the disk 14 in one direction. Rotation of the disk 14 in the other direction is limited by the engagement of the disk shoulders 60 and 62 relative to the shoulders 44 and 46, respectively, on the arm 18. It is also to be noted that preferably the anvil shoulders 56, 58, 60 and 62 are formed by a cord on the disk 14 and that the anvil shoulders 56, 58, 60 and 62 are shaped to be complementary with the outwardly directed shoulders 40, 42, 44 and 46 on the arms.

As best seen in FIG. 7, as the tool 10 is manually actuated to rotate the jaws 26 and 28 together, the coacting shoulders on the anvil 52 and the coacting shoulders on the arms 16 and 18 rotate and maintain the anvil 52 against the ear 70 of the clamp 72.

The backup disk 14 may be easily incorporated within the crimper 12 by disassembling the crimper 12 by disconnecting the snap ring 21 from the pivot pin 20, pushing out the pivot pin 20 and then inserting the disk 14 in the slot in the inner jaw. The pivot pin is reinserted, passing through the hole 50 in the backup disk 14, and the snap ring 21 is reinstalled. The disk 14 provides a simple, inexpensive backup that is always a constant distance from the biting edges of the jaws 26 and 28, is prevented from rotating away from the mouth of the jaws 26 and 28 by the coacting shoulders, prevents excessive outward bulging of the ears 70 of the clamp 72, and provides additional structural support for the second ends of the arms 16 and 18 by filling their slots.

Figure 8:
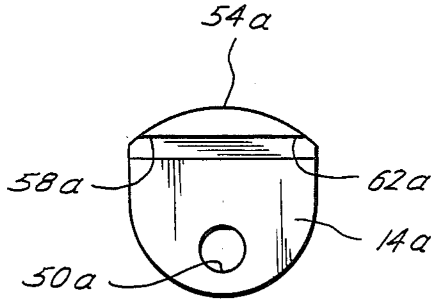
FIG. 8 is an elevational view of another embodiment of the backup disk.
Figure 9:
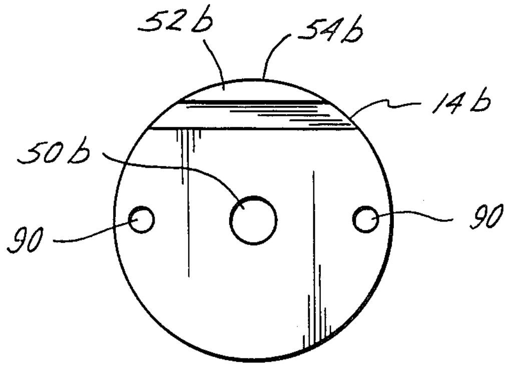
FIG. 9 is an elevational view of still another embodiment of the backup disk.

Of course, other and further embodiments may be provided. FIGS. 8 and 9 show two other embodiments of the backup disk wherein like parts are designated by the same numerals as in FIGS. 1–7, with the addition of the suffix "a" and "b" respectively. In FIG. 8, the disk **14*a* is not circular but is a section of a circle but includes an arcuate anvil 52*a* having shoulders at each end. FIG. 9 shows a disk 14*b* which is identical with the disk 14** but with the addition of stop shoulder pins 90 which protrude out of preferably both sides of the disk **14*b*. The pins are illustrated in FIG. 4 showing their coaction with the arms 16 and 18 for limiting rotation of the disk and maintaining the anvil in position. If desired, the pins 90 may be used in addition to the anvil shoulders 56, 58, 62 and 64** or the anvil shoulders may be omitted.

The present invention, therefore, is well adapted to carry out the objects and attain the ends and advantages mentioned as well as others inherent therein. While a presently preferred embodiment of the invention has been given for the purpose of disclosure, numerous changes in the details of construction, and arrangement of parts, will be readily apparent to those skilled in the art and which are encompassed within the spirit of the invention and the scope of the appended claims.

What is claimed is:

1. In combination with a manually operated tool for tightening ear clamps having two complementary one piece lever arms pivotally connected at an intermediate point by a pivot pin, said arms having at one end handle portions and at the other ends complementary jaw portions, said other ends each including first and second spaced sides separated by a slot with the jaw portions extending across said slot, each of said arms including shoulder means cooperable with a backup disk comprising, a one piece backup disk including a hole, said disk rotatably positioned in the slot between the first and second sides of each of the other ends of said arms with the disk hole encircling the pivot pin, said disk being rotatable about the pivot pin relative to said arms with said disk always positioned at a constant distance from said jaws, an arcuate anvil positioned at the outer periphery of one section of the disk, said anvil forming an outer backup surface for engaging a clamp, anvil shoulders positioned at each end of the anvil, said anvil shoulders engagable by the shoulders on the arms for rotating and holding said anvil adjacent said jaw portions as the jaws close.

2. The apparatus of claim 1 wherein said anvil is thicker than the disk.

3. The apparatus of claim 1 wherein the backup surface is arcuately shaped.

4. The apparatus of claim 1 wherein the anvil shoulders are formed by a chord and said anvil shoulders are shaped to be complementary with the outwardly directed shoulders.

5. The apparatus of claim 1 wherein the anvil shoulders are pins extending outwardly from the disk.

6. In combination with a manually operated tool for tightening ear clamps having two complementary one piece lever arms pivotally connected at an intermediate point by a pivot pin, said arms having at one end handle portions and at the other ends complementary jaw portions, said other ends each including first and second spaced sides separated by a slot with the jaw portions extending across said slot, each of said first and second sides including an outwardly directed shoulder adjacent said slot, said shoulder positioned adjacent to but spaced from the jaw portions, and cooperable with a backup disk comprising, a one piece circular backup disk including a hole, said disk rotatably positioned in the slot between the first and second sides of each of the other ends of said arms with the disk hole encircling the pivot pin, said disk being rotatable about the pivot pin relative to said arms with said disk always positioned at a constant distance from said jaws, an anvil positioned at the outer periphery of one section of the disk, said anvil forming an outer backup surface for engaging a clamp, said anvil including shoulders at each end on an inner surface, said anvil shoulders engagable by the outwardly directed shoulders on the arms for rotating and holding said anvil adjacent said jaw portions as the jaws close.

* * * * *